United States Patent
Gill et al.

(10) Patent No.: US 10,195,659 B2
(45) Date of Patent: Feb. 5, 2019

(54) TURBINE BLADE, METHOD FOR PRODUCING SAME AND METHOD FOR DETERMINING THE POSITION OF A CASTING CORE USED WHEN CASTING A TURBINE BLADE

(71) Applicant: Siemens Aktiengesellschaft, Munich (DE)

(72) Inventors: Markus Gill, Ibbenbüren (DE); Christian Menke, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/531,455

(22) PCT Filed: Nov. 26, 2015

(86) PCT No.: PCT/EP2015/077726
§ 371 (c)(1),
(2) Date: May 29, 2017

(87) PCT Pub. No.: WO2016/087293
PCT Pub. Date: Jun. 9, 2016

(65) Prior Publication Data
US 2017/0259327 A1 Sep. 14, 2017

(30) Foreign Application Priority Data
Dec. 1, 2014 (EP) ..................................... 14195672

(51) Int. Cl.
*F01D 5/14* (2006.01)
*B22C 9/10* (2006.01)
(Continued)

(52) U.S. Cl.
CPC .............. *B22C 9/10* (2013.01); *B22D 31/002* (2013.01); *F01D 5/14* (2013.01); *F01D 5/147* (2013.01);
(Continued)

(58) Field of Classification Search
CPC . F01D 5/147; F01D 5/20; F01D 11/08; F05D 2220/32; F05D 2230/21
(Continued)

(56) References Cited

U.S. PATENT DOCUMENTS 6,347,660 B1 * 2/2002 Sikkenga ................ B22C 7/026
164/137
6,832,889 B1 * 12/2004 Lee .......................... F01D 5/184
415/115
(Continued)

FOREIGN PATENT DOCUMENTS

DE 102005021666 A1 12/2005
EP 1923153 A1 5/2008
WO 2005103451 A1 11/2005

OTHER PUBLICATIONS

EP Search Report dated Jun. 15, 2015, for EP patent application No. 14195672.2.
(Continued)

*Primary Examiner* — Aaron R Eastman
(74) *Attorney, Agent, or Firm* — Brusse Wolter Sanks & Maire (57) ABSTRACT

A turbine blade has a blade geometry defined in a coordinate system and at least one cavity which is open to the outside and which has a blade internal surface. At least one planar detection surface, which is accessible for the measuring head of a coordinate measuring device, is formed in the blade internal surface, wherein the at least one planar detection surface is assigned a defined design position and/or a defined
(Continued)

design orientation with respect to the coordinate system in which the blade geometry is defined.

7 Claims, 3 Drawing Sheets

(51) Int. Cl.
 *B22D 31/00* (2006.01)
 *F01D 21/00* (2006.01)
 *G01B 5/20* (2006.01)
(52) U.S. Cl.
 CPC ........ *F01D 21/003* (2013.01); *F05D 2220/32* (2013.01); *F05D 2230/21* (2013.01); *G01B 5/205* (2013.01)
(58) Field of Classification Search
 USPC .......................................................... 416/61
 See application file for complete search history.

(56) References Cited

U.S. PATENT DOCUMENTS

| | | | |
|---|---|---|---|
| 2005/0196277 A1* | 9/2005 | Wang | F01D 5/20 416/92 |
| 2005/0247425 A1 | 11/2005 | Devine et al. | |
| 2006/0008350 A1* | 1/2006 | Chlus | F01D 5/20 416/96 R |
| 2009/0067994 A1* | 3/2009 | Pietraszkiewicz | F01D 11/08 415/173.1 |
| 2010/0080711 A1* | 4/2010 | Page | F01D 5/20 416/97 R |
| 2012/0034097 A1 | 2/2012 | Marra et al. | |
| 2012/0070307 A1* | 3/2012 | Poon | F01D 5/20 416/97 R |
| 2014/0316555 A1* | 10/2014 | Buchanan | B23K 26/34 700/190 |

OTHER PUBLICATIONS

International Search Report dated Mar. 1, 2016, for PCT/EP2015/077726.

\* cited by examiner

TURBINE BLADE, METHOD FOR PRODUCING SAME AND METHOD FOR DETERMINING THE POSITION OF A CASTING CORE USED WHEN CASTING A TURBINE BLADE

CROSS REFERENCE TO RELATED APPLICATIONS

This application is the US National Stage of International Application No. PCT/EP2015/077726 filed Nov. 26, 2015, and claims the benefit thereof. The International Application claims the benefit of European Application No. EP14195672filed Dec. 1, 2014. All of the applications are incorporated by reference herein in their entirety.

FIELD OF INVENTION

The present invention relates to a turbine blade, in particular a guide vane or rotor blade of a gas turbine, with at least one outwardly open cavity having a blade inner surface, and to a method for producing such a turbine blade. The invention also relates to a method for determining the position of a casting core used when casting a turbine blade, after casting of the turbine blade.

BACKGROUND OF INVENTION

Turbine blades, such as in particular guide vanes or rotor blades of gas turbines, often have outwardly open cavities. These can reach deep into the blade interior, as is the case for example for cavities for passing cooling air through the turbine blade, or only slightly into the blade interior, as is the case for example for the depression of a crown formed at the blade tip. Cavities of this type are kept open during casting of the turbine blade by means of casting cores which are removed chemically or thermally from the cavity, via an outward opening of the cavity, once the material from which the turbine blade is made has solidified. In that context, the exact position of the casting cores during the casting process is hugely significant for the thicknesses of the turbine blade walls and, in the case of a crown, for the position of the crown base in the tip of the turbine blade.

In the context of qualification processes, turbine components are therefore tested once with respect to the radial position of the casting core. However, the destructive nature of the testing means that the tested turbine blade can no longer be used. This limits the frequency with which such quality testing can be carried out.

DE 10 2005 021 666A1 describes a method and a device for determining the position of configuration features, created by means of a core, in a lost-wax cast item. For this, core reference bases are incorporated into a core bead or flash section of the cast item, and serve as a precise reference system for locating the inner geometry and the position of structural features. On the basis of this reference system, it is then possible to carry out exact normalizing steps or precise chip-removing machining steps on the inner features created by means of a core. After the machining steps, the core bead or flash section is removed with the core reference base by chip-removing machining.

US 2012/0034097 A1 describes a turbine component having elements which make it easier to measure the wall thickness of the turbine components in the context of an inspection. The elements respectively comprise a planar inner inspection surface and a planar outer inspection surface that is aligned with the inner inspection surface. The inner inspection surface is produced by means of a casting core which has a surface for forming the inner inspection surface. In the context of the inspection, an inspection device such as an ultrasound probe, an eddy current probe or the like can transmit a signal into the mutually aligned inner and outer inspection surfaces in order to use the signal reflecting back to the inspection device to determine the wall thickness of the turbine component.

During mass production of turbine blades, it is possible for the position and/or orientation of the casting core(s), in particular the radial position of the casting core(s), to deviate, which becomes apparent only later when refurbishing worn turbine blades. A refurbishment process for a turbine blade generally involves chemically removing coatings, whereby an albeit small layer of the wall is also removed. Now, if during the casting process a casting core was not in its optimal position, this means that in some regions of the turbine blade the wall thickness is suboptimal. This reduces the number of possible refurbishment processes for the gas turbine blade, which reduces the maximum service life of turbine blades and thus increases costs for a gas turbine plant. The wall thickness also influences heat transfer zones of a turbine blade.

SUMMARY OF INVENTION

The present invention has a first object of providing a method for producing a turbine blade by means of which it is possible to determine, non-destructively and at any time, the position, in particular the radial position, of one or more casting cores in a turbine blade after completion of the turbine blade.

The present invention has a second object of providing an advantageous method for non-destructively determining the position of a casting core, used when casting a turbine blade, in the completed turbine blade, which method makes it possible to determine, non-destructively and at any time after completion of the turbine blade, the position of the casting core.

The present invention has a third object of providing a turbine blade with an outwardly open cavity, having a blade inner surface, which makes it possible to determine, non-destructively and at any time, the position of a casting core used in production of the turbine blade.

The first object is achieved with a method for producing a turbine blade, the second object is achieved with a method for determining the position of a casting core used in casting a turbine blade, and the third object is achieved with a turbine blade. The dependent claims contain advantageous configurations of the invention.

In the inventive method for producing turbine blades with a blade geometry that is defined in a coordinate system and with at least one outwardly open cavity having a blade inner surface, the blades are cast, wherein the at least one outwardly open cavity is formed by means of at least one casting core which has a casting core outer surface that forms the blade inner surface and which is removed from the cavity after the casting process. In that context, the casting core outer surface has at least one planar reference surface with a defined setpoint position and a defined setpoint orientation in relation to a coordinate system in which the blade geometry is defined. The at least one planar reference surface is arranged in the casting core surface such that it forms, in the blade inner surface, at least one planar scanning surface that is accessible for the measuring head of a coordinate measuring device. By virtue of the fact that the scanning surface that is accessible for the measuring head of a coordinate measuring device is a planar surface, it is possible, by scanning at least three points on the scanning surface, to determine not only the position of the planar scanning surface but also the orientation of the scanning surface. Because the scanning surface is arranged in the blade inner surface, it does not have to be removed at the end of the production process.

Using the defined scanning surface, whose setpoint position and setpoint orientation in the coordinate system in which the blade geometry is defined are known, it is possible, with the aid of a coordinate measuring device, to determine, with high precision with respect to the blade geometry, the position and/or the orientation of the casting core when casting the turbine blade after completion of the turbine blade and without destroying the latter. This permits frequent monitoring of the core position during continued mass production, without this requiring the destruction of finished turbine blades. It is therefore possible to check the core position during production of the turbine blade batch with high-frequency, and thus deviations in the radial core position, from the setpoint position or the setpoint orientation, can be identified and corrected promptly. It is thus possible to keep the wall thicknesses of turbine blades within the optimal range during the entire production process, and thus ensure a high number of possible refurbishments for the entire batch of turbine blades. Furthermore, maintaining the optimum wall thicknesses also means that thermodynamic heat transfer zones in the turbine blades of a batch can be optimized in a highly reproducible manner. Both of these have a positive effect on the service life of the turbine blades since it is possible to ensure a high number of refurbishments, and hot spots during operation of the turbine blades can be reliably avoided. The method according to the invention also makes it possible to determine the core position at any time after completion of the turbine blade, that is to say for example even in the context of a refurbishment process when the turbine blade has been worn down in operation. Thus, the core position can be measured using a coordinate measuring system prior to refurbishment of a turbine blade, and thus the exact position of the inner surface can be determined. Since the exact position of the outer surface can also be determined by measuring in the same reference system as the position of the inner surface, it is possible to use the position of the inner surface and the position of the outer surface to determine the actual wall thickness of the turbine blade in order to be able to establish a maximum amount of wall material that can be removed in the context of the refurbishment. Information of this nature can be useful when deciding whether or not the turbine blade can be refurbished while keeping the minimum required wall thickness.

The outwardly open cavity of the turbine blade to be produced with the method according to the invention can have at least one opening in an outer surface of the turbine blade. In one advantageous embodiment of the method, the at least one casting core therefore has a casting core section that forms the at least one opening, and the at least one planar reference surface is formed in the casting core section forming the opening or close to the casting core section forming the opening such that the planar scanning surface, formed in the blade inner surface by the planar reference surface, is easily accessible, from outside the turbine blade, for a measuring head of a coordinate measuring device. Typically, the at least one opening of the turbine blade also serves for the outward removal of the casting core material during thermal or chemical removal of the casting core from the cavity of the turbine blade. Openings of this type are generally easily accessible from the outside, and therefore the scanning surfaces formed in this region are also easily accessible likewise from the outside.

At least one of the planar reference surfaces can in particular be formed in a casting core section forming an opening such that there is formed, as the scanning surface, a shoulder which at least partially surrounds the corresponding opening in the outer surface of the turbine blade and is recessed with respect to the outer surface of the turbine blade, and which can in particular also entirely surround the opening. A shoulder of this type makes it possible, once the core position has been determined using the scanning surface, to insert a plate such as a sealing plate into the opening without this standing proud of the outer surface of the blade root. In the context of a refurbishment process, the plate can then be removed before the core position is determined anew, in the event that the scanning surface is required for determining the core position. Plates can for example be used to close an opening or to give it a specific shape. An opening is closed for example when it serves only for establishing the core position during production of the turbine blade and is not used later as an inlet point for cooling air into the interior of the turbine blade. Holes of this kind are generally sealed with sealing plates, wherein hitherto the sealing plates were affixed to the outside of the blade root and therefore projected into the interspace between the underside of the blade root and the bottom surface of the slot in a rotor disk, into which the blade root was inserted. However, this reduces the flow cross section available for the flow of cooling air in the interspace, which has to be taken into account when configuring the flow channel formed between the underside of the blade root and the bottom of the slot. In addition, if the plate were to partially separate, it would project into the cooling air flow in the interspace between the underside of the blade root and the bottom of the slot, which can lead to leakage and turbulence. By contrast, if the sealing plate is sunk into the underside of the blade root, by virtue of the scanning surface being configured as a recess with respect to the outer surface of the blade root, and therefore does not stand proud of the outer surface, the flow cross section is not reduced by the sealing plate and therefore the distance between the underside of the blade root and the bottom surface of the slot can be reduced, or less pressure is required in order to maintain the flow. Sinking the sealing plate also makes it possible to avoid a partially separated sealing plate projecting into the flow channel, and thus turbulence can be better avoided.

In the method according to the invention, the at least one casting core can in particular have a planar reference surface with a surface normal running in the radial direction of the turbine blade that is to be produced or counter to the radial direction of the turbine blade that is to be produced. Additionally or alternatively, the at least one casting core can have a planar reference surface with a surface normal running in the axial direction of the turbine blade that is to be produced or counter to the axial direction of the turbine blade that is to be produced. Further additionally or alternatively, the at least one casting core can have a planar reference surface with a surface normal running in the circumferential direction of the turbine blade that is to be produced or counter to the circumferential direction of the turbine blade that is to be produced. For example, a casting core can serve for forming a cavity that is open counter to the radial direction of the turbine blade that is to be produced. In this case, it is appropriate if the casting core has at least one planar reference surface with a surface normal running in the radial direction of the turbine blade that is to be produced, such that the scanning surface formed with the aid of the reference surface has a surface normal that runs counter to the radial direction. Such cavities which are open counter to the radial direction of the turbine blade that is to be produced are for example cavities for cooling air for cooling rotor blades of gas turbine plants, which have openings for supplying the cooling air in the blade root. The opening then allows the measuring head of a coordinate measuring device to reach the scanning surface. However, guide vanes of gas turbine plants also typically have openings at both radial ends, for the supply and discharge of cooling air, and therefore the cavity of a guide vane is often also open counter to the radial direction. In another example, a casting core serves for forming a cavity that is open in the radial direction of the turbine blade that is to be produced, and the casting core has a planar reference surface with a surface normal running counter to the radial direction of the turbine blade that is to be produced. The reference surface then forms a scanning surface whose surface normal runs in the radial direction. As previously stated, a cavity that is open in the radial direction can for example have openings in the radially opposite ends of a guide vane for a gas turbine, for the supply and discharge of cooling air. However, rotor blades of gas turbines can also have cavities that are open in the radial direction. An example of this is the crown of a rotor blade, in which walls of the blade airfoil, projecting in the radial direction, form a depression in the blade tip. In both cases, the scanning surface can be arranged so as to be easily accessible for the measuring head of a coordinate measuring device.

A second aspect of the present invention provides a method for determining the position of a casting core used when casting a turbine blade, after completion of the turbine blade. Determining the position of the casting core used when casting a turbine blade can then be used for example in the context of a refurbishment process after operation of the turbine blade. In the context of the method according to the invention, use is made of a turbine blade produced according to the inventive method for producing turbine blades. In such a turbine blade, the at least one planar scanning surface in the blade inner surface is scanned with the measuring head of a coordinate measuring system in order to determine the position and/or orientation of the at least one planar scanning surface. This can for example be done at the beginning of a refurbishment process for the turbine blade. The determined position and/or orientation of the at least one planar scanning surface is then used to determine the position and/or orientation of the casting core used when casting the turbine blade. Scanning the planar scanning surface with the measuring head of the coordinate measuring device makes it possible to measure the position and/or orientation in relation to the coordinate system in which the blade geometry is defined, which can then be used to determine the exact position and/or the exact orientation of the casting core in relation to the blade geometry. The position and/or orientation of the casting core during casting of the turbine blade can in turn be used to determine the wall thickness between the blade inner surface, formed by the outer surface of the casting core, and the blade outer surface. All this can be done without destroying the turbine blade which is being measured. It is thus possible, in the context of mass production, to check a large number of turbine blades with respect to the position of the casting core during casting of the turbine blade, in particular with respect to the radial position of the casting core, and thus the method according to the invention permits early identification of deviations in the position or orientation of the casting core, from the setpoint position or setpoint orientation, during casting of the turbine blades. The position of the casting core can also be determined at any later time, for example in the context of a refurbishment process. This has a positive effect on the service life of the turbine blades. If three mutually non-parallel, planar scanning surfaces are present, it is possible to determine, in all three translatory and all three rotary degrees of freedom, the position and orientation of the casting core with which the scanning surfaces were formed.

A third aspect of the present invention provides a turbine blade with a blade geometry that is defined in a coordinate system and with at least one outwardly open cavity having a blade inner surface. In the blade inner surface of the turbine blade, there is formed, for a coordinate measuring device, at least one planar scanning surface that is accessible for the measuring head of a coordinate measuring device, which surface is assigned a defined setpoint position and a defined setpoint orientation in relation to the coordinate system in which the blade geometry is defined. The turbine blade according to the invention can in particular be produced using the inventive method for producing turbine blades. The characteristics and advantages explained in relation to the production method are therefore realized in the inventive turbine blade. The turbine blade according to the invention can also be used in the inventive method for determining the position of a casting core used when casting the turbine blade, after casting of the turbine blade. In that context, it is advantageous if the planar scanning surface is located in or close to an opening, in an outer surface of the turbine blade, of the outwardly open cavity, such that it is easily accessible, from outside the turbine blade, for a measuring head of a coordinate measuring device.

In the turbine blade according to the invention, the blade inner surface can have at least one planar scanning surface whose surface normal runs in the radial direction of the turbine blade or counter to the radial direction of the turbine blade. Additionally or alternatively, the blade inner surface can have at least one planar scanning surface whose surface normal runs in the axial direction of the turbine blade or counter to the axial direction of the turbine blade. Further additionally or alternatively, the blade inner surface can have at least one planar scanning surface whose surface normal runs in the circumferential direction of the turbine blade or counter to the circumferential direction of the turbine blade. If a planar scanning surface whose surface normal runs in the radial direction or counter to the radial direction, a planar scanning surface whose surface normal runs in the axial direction or counter to the axial direction of the turbine blade, and a planar scanning surface whose surface normal runs in the circumferential direction of the turbine blade or counter to the circumferential direction of the turbine blade are all present, it is possible to precisely determine the position and/or orientation of the casting core in relation to the coordinate system in which the blade geometry is defined, in all translatory and rotary degrees of freedom. However, if all that is required is the position and orientation of the casting core in the radial direction or in the axial direction or in the circumferential direction, it is sufficient to provide a planar scanning surface whose surface normal runs in the radial direction or counter to the radial direction of the turbine blade, a scanning surface whose surface normal runs in the axial direction or counter to the axial direction of the turbine blade, or a scanning surface whose surface normal runs in the circumferential direction or counter to the circumferential direction of the turbine blade. By virtue of the fact that the scanning surface is a planar surface, it is possible, by scanning at least three points on the scanning surface, to detect not only a displacement from the setpoint position in or counter to the respective normal direction, but also a rotation of the orientation of the normal direction in relation to the setpoint orientation.

Typically, the radial core position during casting of the turbine blade is of particular interest. If the outwardly open cavity is open counter to the radial direction of the turbine blade, the planar scanning surface can in particular have a surface normal running counter to the radial direction of the turbine blade. This can for example be realized if the turbine blade is a rotor blade which has one or more cooling air openings in the blade root for supplying cooling air into the rotor blade. However, guide vanes of gas turbines can also have cavities which are open counter to the radial direction of the turbine blade and serve for example for the supply and discharge of cooling air. If by contrast the outwardly open cavity is open in the radial direction, the at least one planar scanning surface can in particular have a surface normal running in the radial direction of the turbine blade. This variant is particularly significant if the core position of casting cores for producing a crown at the blade tip of a rotor blade of a gas turbine is to be determined. However, guide vanes of gas turbines also often have cavities which are open in the radial direction of the turbine blade. These can serve for example for the supply and discharge of cooling air. A scanning surface with a surface normal running in the radial direction of the guide vane is advantageous in this case too.

In one refinement of the turbine blade according to the invention, the opening is provided with a plate that rests on the scanning surface, for example in order to give the opening a certain shape or to close the opening. As already described, an opening is closed for example when it serves only for establishing the core position during production of the turbine blade and is not used later as an inlet point for cooling air into the interior of the turbine blade.

In the case of at least one opening in the outer surface of the turbine blade, in particular in the blade root, the scanning surface can be a shoulder which surrounds the opening and is recessed with respect to the outer surface of the turbine blade. This makes it possible, for example, to sink one of the previously described sealing plates into the turbine blade, in particular into the underside of the blade root.

Also provided is a gas turbine having a turbine blade according to the invention.

Further features, properties and advantages of the present invention are provided by the description below of exemplary embodiments, with reference to the accompanying figures.

DETAILED DESCRIPTION OF INVENTION

Figure 1:
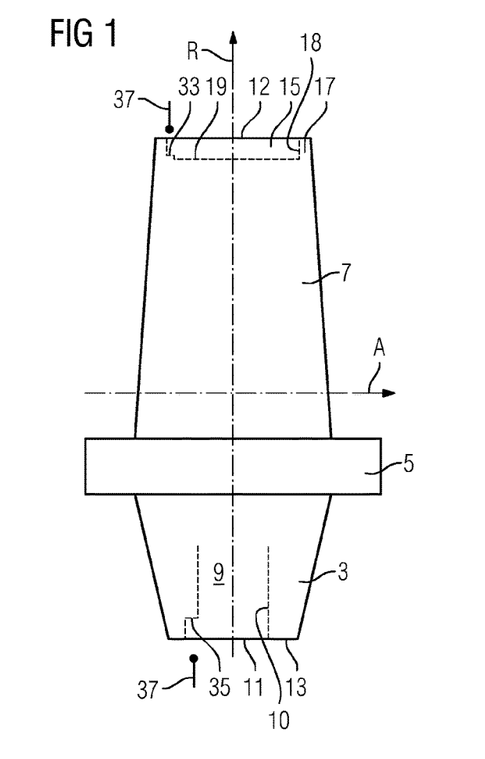
FIG. 1 shows an exemplary embodiment for a turbine blade according to the invention, which represents a rotor blade, designed according to the invention, of a gas turbine.

There follows a description of an exemplary embodiment of the invention, with reference to FIG. 1. The figure shows a turbine blade 1 designed according to the invention, which in the present exemplary embodiment is designed as a rotor blade of a gas turbine. The turbine blade 1 shown comprises a blade root 3, a blade platform 5 and a blade airfoil 7, wherein the blade root 3 and the blade airfoil 7 extend in essentially opposite directions from opposite sides of the blade platform. The turbine blade 1 has a radial direction R which corresponds to the radial direction of the turbine when the turbine blade 1 is installed in a turbine. The turbine blade 1 also has an axial direction A which corresponds to the axial direction of the turbine when the turbine blade 1 is installed in a turbine, and a circumferential direction which runs perpendicular to the radial direction R and perpendicular to the axial direction A and corresponds to a tangent of the circumferential direction at the location of the turbine blade when the turbine blade is installed in a turbine.

In the present exemplary embodiment, the turbine blade 1 comprises two cavities which are outwardly open, that is to say that they are accessible via openings 11, 12 in the outer surface of the turbine blade 1. The first of these cavities is the cavity 9 which is shown in part by dashed lines in the region of the blade root 3 and which extends through the blade root 3, the blade platform 5 and the blade airfoil 7, and which channels cooling air for cooling the turbine blade 1 during operation of the turbine in which the turbine blade 1 is installed. The cooling air cools the blade and can for example leave the turbine blade 1 via cooling air openings, primarily in the region of the blade airfoil 7 (not shown), for example in order to form a cooling air film over surface regions of the turbine blade.

The second cavity is formed in the blade tip and consists of a depression 15 which is bounded by a wall 17 projecting beyond the bottom of the depression 15. The depression 15, together with the wall 17, forms what is referred to as a crown of the turbine blade 1 and has an opening 12 in the radial direction R of the turbine blade 1.

Figure 2:
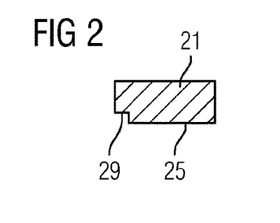
FIG. 2 shows, schematically, a first casting core for producing the turbine blade shown in FIG. 1.
Figure 3:
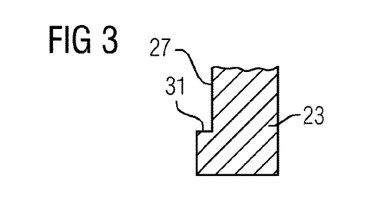
FIG. 3 shows, schematically, a detail of a second casting core for producing the turbine blade shown in FIG. 1.

The turbine blade 1 is produced by a casting method which uses a casting mold with two casting cores. In that context, the casting cores each have a casting core outer surface whose shape matches the inner surface of the cavity that is to be formed. During the casting process, the casting cores are placed in the molds for the blade outer surface and form the mold for the blade inner surfaces, that is to say the inner surfaces of the cavity 9, the bottom surface 19 and the inner surfaces of the crown walls 17. The casting cores 21 and 23 are shown schematically in FIGS. 2 and 3, with FIG. 2 showing the casting core 21 for the depression 15 and FIG. 3 showing a detail of the casting core 23 for the cooling air duct 9. The casting core outer surfaces 25, 27 form, when casting the turbine blade 1, the bottom surface 18 of the depression of the crown walls 17, or the inner surface 10 of the cooling air duct 9.

The casting cores 21, 23 shown in FIG. 2 and FIG. 3 each have a planar reference surface 29, 31, wherein in the present exemplary embodiment the planar reference surface 29 of the casting core 21 for the depression 15 has a surface normal which is oriented counter to the radial direction R of the turbine blade 1 when the casting core is inserted into the mold for the turbine blade 1. The casting core 23 for the cooling air duct 9 also has a planar reference surface 31. In contrast to the planar reference surface 29 of the casting core 21, however, the planar reference surface 31 of the casting core 33 is oriented such that its surface normal points in the radial direction R of the turbine blade 1 when the casting core is inserted into the mold for the turbine blade 1.

For casting the turbine blade 1, the casting cores 21, 23 are integrated into the mold for the turbine blade 1, and then the mold is filled with a liquid superalloy, typically a nickel-based, cobalt-based or iron-based superalloy. Once the superalloy has solidified, the mold is removed from the turbine blade and then the casting cores 21, 23 are thermally or chemically removed from the depression 15 and, respectively, from the cooling air duct 9, such that the inner surfaces of the cavities 9, 15, that is to say the inner surface 10 of the cooling air duct 9 and the bottom surface 19 and the inner wall surfaces 16 of the crown walls 17, are exposed.

As already mentioned, the casting cores 21, 23 have planar reference surfaces 29, 31 whose surface normals have a defined orientation in relation to the coordinate system in which the blade geometry is defined, when the casting cores 21, 23 are in the cavities of the turbine blades 1. Since the casting core outer surfaces 25, 27 match the blade inner surfaces, the blade inner surfaces formed with the casting cores 21, 23 also have planar surfaces with defined orientation of the surface normals. In the case of the casting core 21 for the depression 15 in the blade tip, the reference surface 29 forms a planar surface 33 whose surface normal is oriented parallel to the radial direction R of the turbine blade. The planar reference surface 31 of the casting core 23 forms, in the vicinity of the opening 11 in the underside 13 of the blade root 3, a planar surface 35 whose surface normal is oriented antiparallel to the radial direction R of the turbine blade. These two planar surfaces, that is to say the planar surface 33 in the depression 15 and the planar surface 35 in the region of the opening 11 in the underside 13 of the blade root 3, represent easily accessible planar scanning surfaces for scanning with the measuring head 37 of a coordinate measuring device.

When the casting cores 21, 23 are correctly inserted into the casting mold for casting the turbine blade 1, the surface normal 33 is therefore oriented parallel to the radial direction and the surface normal of the planar scanning surface 35 is oriented counter to the radial direction. Furthermore, both scanning surfaces have a defined radial position. If, by contrast, the casting cores 21, 23 deviate in position and/or orientation from their setpoint position and/or the setpoint orientation in the casting mold for casting the turbine blade 1, this is reflected in the radial position and/or the orientation of the planar scanning surfaces 33, 35 in the depression 15 or in the cooling air duct 9, in relation to the blade geometry. The coordinate measuring device serves to determine the position and/or orientation of the respective planar scanning surfaces in relation to the blade geometry. Since the planar scanning surfaces 33, 35 represent surfaces that match the planar reference surfaces 29, 31 of the casting cores 21, 23, the position and orientation of the planar scanning surfaces 33, 35 scanned with the measuring head 37 can be used to determine the position and orientation of the casting cores 21, 23 during the casting process.

If, during the casting process, the casting cores 21, 23 have deviated in position and/or orientation from their setpoint position or setpoint orientation, this can be observed in the finished turbine blade. Since the position and/or orientation of the casting cores during casting of the turbine blade 1 can be determined non-destructively from the finished turbine blade 1, it is possible to examine a large number of turbine blades during mass production in the manner of spot checks, such that turbine blades can be checked at short intervals. It is thus possible for changes in the position and/or orientation of the casting cores 21, 23, arising during mass production, to be identified early, which permits prompt correction of the position and/or orientation of the casting cores for the subsequent casting processes of the mass production. Any deviations in the position and/or orientation of the casting cores 21, 23 can thus be corrected before they exceed a predefined degree, which makes it possible to improve the quality of the mass-produced turbine blades, in particular with regard to their wall dimensions and with regard to their thermodynamic transition zones. In that context, particularly critical wall dimensions are the wall thicknesses in the region of the blade airfoil and/or the wall thickness in the region of the bottom surface 19 of the depression 15, which is also referred to as the crown bottom height.

Although in the present exemplary embodiment the reference surfaces of the casting cores 21, 23 have surface normals with an orientation that runs parallel or antiparallel to the radial direction, the casting cores 21, 23 can additionally or alternatively also have reference surfaces whose surface normals run parallel or antiparallel to the axial direction A of the turbine blade 1. The planar scanning surfaces formed with planar reference surfaces of this type then have surface normals which, in the case of correct position and orientation of the casting cores 21, 23, run antiparallel or parallel to the axial direction. There is equally the possibility, additionally or alternatively, to provide in the casting cores 21, 23 planar reference surfaces whose surface normals run parallel or antiparallel to the circumferential direction of the turbine blade 1. The planar scanning surfaces thus formed in the inner surfaces of the turbine blade then have surface normals which run antiparallel or parallel to the circumferential direction of the turbine blade 1.

Figure 4:
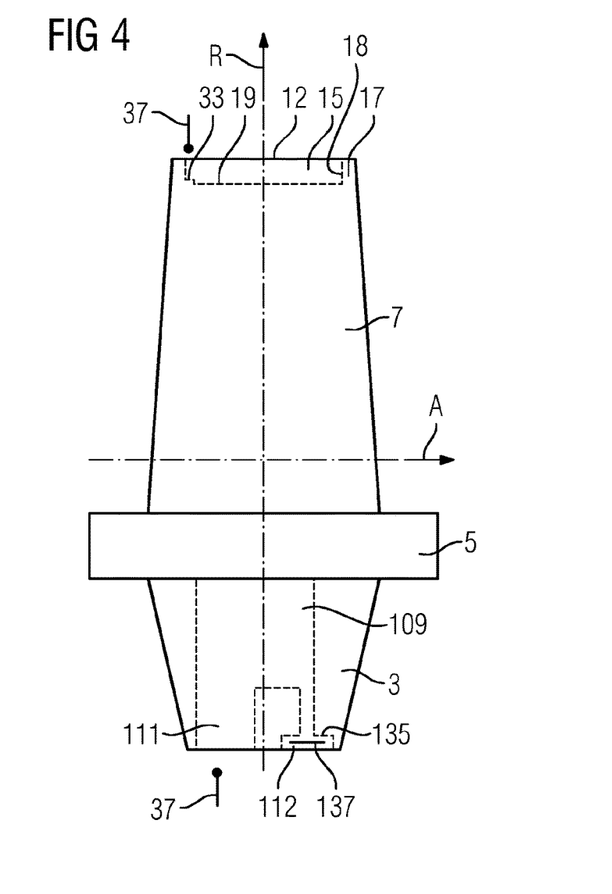
FIG. 4 shows a second exemplary embodiment for a turbine blade according to the invention, which represents a rotor blade, designed according to the invention, of a gas turbine.

There follows a description of a second exemplary embodiment of the invention, with reference to FIG. 4. The figure shows a turbine blade 100 designed according to the invention, which as in the first exemplary embodiment is designed as a rotor blade of a gas turbine. Elements of the turbine blade of FIG. 4 which correspond to elements of the turbine blade of FIG. 1 are provided with the same reference numerals as in FIG. 1 and will not be explained anew, in order to avoid repetitions. The description of the second exemplary embodiment is therefore limited to the differences with respect to the first exemplary embodiment.

The turbine blade of the second exemplary embodiment differs from that of the first exemplary embodiment essentially in that, in addition to at least one opening 111 of the cooling air duct 109 which serves to supply cooling air into the cooling air duct 109, there is also at least one opening 112 in the blade root 3, which does not serve to supply cooling air into the cooling air duct 109, but merely represents an auxiliary opening which serves to secure the casting core 123 during the production process for the turbine blade 1. This auxiliary opening 112 has a scanning surface 135 which, in the present exemplary embodiment, is designed as a planar recess 135 surrounding the auxiliary opening 112. Thus, the auxiliary opening 112 is surrounded by a depression into which a sealing plate 137 can be sunk after completion of the turbine blade 101 and after scanning of the scanning surface to determine the core position. The sealing plate 137 can then be secured to the scanning surface 135, for example by spot soldering or spot welding. The position of the sealing plate 137 in the depression means that it does not stand proud of the underside 13 of the blade root, so that the sealing plate 137 does not impair the cooling air flow duct formed between the underside 13 of the blade root and the bottom of the slot of a rotor disk slot (not shown) into which the turbine blade 1 is inserted. Otherwise, the turbine blade 101 of the second exemplary embodiment does not differ from the turbine blade 1 of the first exemplary embodiment.

Figure 5:
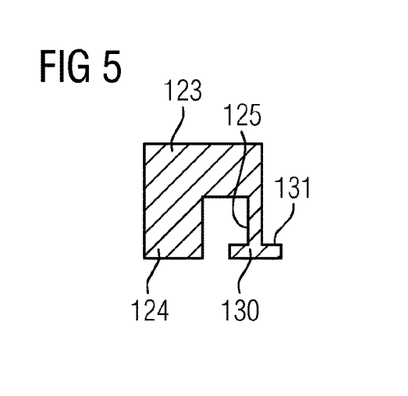
FIG. 5 shows, schematically, a casting core for producing the turbine blade shown in FIG. 4.

A casting core 123 as can be used to produce the turbine blade shown in FIG. 4, is shown in FIG. 5. This comprises a first core projection 124 for producing the opening 111 and a second core projection 125 for producing the opening 112. In the event that more than two openings are to be formed, the core 123 has a corresponding number of core projections. In the present exemplary embodiment, the second core projection 125 has, at its outer end, a broadened portion 130 which is equipped with a surrounding planar surface 131 that serves to form the surrounding scanning surface 135. Since, in the present exemplary embodiment, the auxiliary opening 112 is open radially inward, the surface normal of this surrounding planar surface 131 points radially outward. Otherwise, the casting core 123 of the second exemplary embodiment does not differ from the casting core 23 of the first exemplary embodiment.

Figure 6:
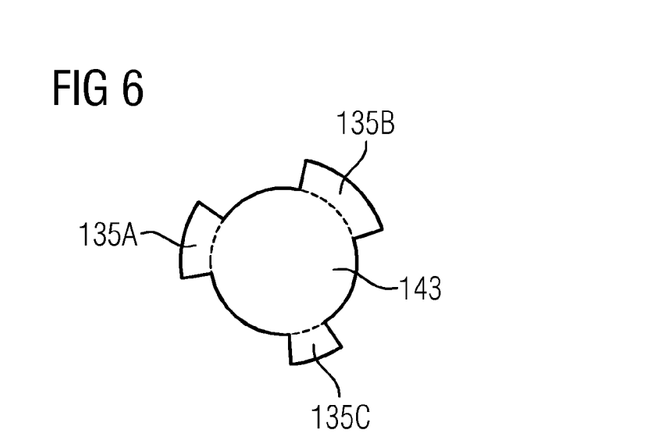
FIG. 6 shows an opening in the blade root of a turbine blade.
Figure 7:
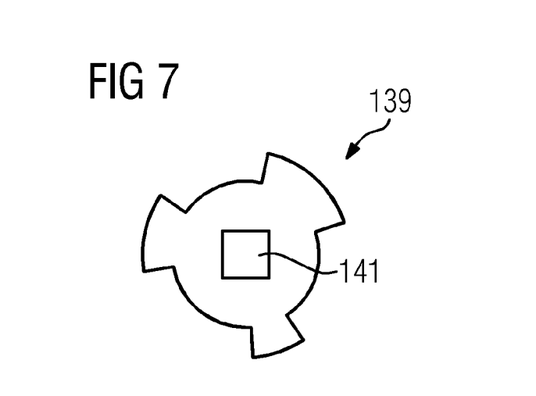
FIG. 7 shows a plate to be inserted into the opening shown in FIG. 6.

In the present exemplary embodiment, the auxiliary opening can also be a cooling air inlet opening into the internal cooling air duct 109 of the turbine blade 101. In this case, the depression formed around the cooling air inlet opening can accommodate, instead of a sealing plate, a plate which serves to define a certain flow cross section for the flow through the opening into the internal cooling air duct. In the present exemplary embodiment, it is then possible to use a sealing plate or a plate 139 defining a certain flow cross section even if the scanning surface is a surface 135A, 135B, 135C which, although recessed with respect to the outer surface of the blade root 3, is not continuous around the opening 143 (see FIG. 6). This makes it possible, with a certain positioning of the scanning surfaces 135A, 135B, 135C at the rim of the opening 143, to predefine a certain orientation of a plate 139 when inserting the plate, for example in order to fix the orientation of a flow cross section 141. When the scanning surface also serves for securing the plate, it is advantageous if there are at least two scanning surfaces around part of the opening. These can advantageously be opposite one another. In the case of a circular opening, it is then possible for, for example, three scanning surfaces 135A, 135B, 135C to be present, which each surround the opening over a certain angle and are distributed evenly or unevenly around the opening (see FIG. 7). In particular, the number and/or size of such scanning surfaces 135A, 135B, 135C arranged around an opening can vary between different batches of turbine blades or between different openings in a turbine blade. It is thus possible for the rim of the opening to serve as a type of lock into which only certain plates can be inserted, in the manner of a key.

The present invention has been extensively described on the basis of exemplary embodiments for explanatory purposes. However, a person skilled in the art will recognize that deviations from the described embodiments are possible. It is thus possible for the surface normal of a reference surface of a casting core to have a different orientation than the orientations specified in the context of the exemplary embodiment. However, the stated orientations are advantageous with regard to the coordinate system in which the blade geometry of the turbine blade 1 is defined. Equally, the invention can also be used in the context of turbine blades other than the illustrated rotor blade of a gas turbine. For example, guide vanes of gas turbines typically have at least one cavity with two openings located at opposite radial ends of the guide vane, in the region of the head airfoils of the guide vanes. These openings generally serve as inlet and outlet openings for cooling air for cooling the guide vanes. In the region of the inlet opening and/or in the region of the outlet opening, it is possible by means of one or more planar reference surfaces to form planar scanning surfaces for determining the position and orientation of the casting core, or of the casting cores when using multiple casting cores. Also, the scanning surface described in relation to the second exemplary embodiment and forming a depression can also be present if, in the blade root, there is only a single cooling air inlet opening into the cooling air duct. Also, it is not absolutely necessary to insert a plate into the depression formed by the scanning surface. Furthermore, it is in principle possible, in the case of turbine blades with an undercut trailing edge, to configure the casting cores used to form the undercut such that planar scanning surfaces are formed in the region of the undercut. The present invention is therefore not intended to be limited to specific feature combinations of the exemplary embodiment, but solely by the appended claims.

The invention claimed is:

1. A method, comprising:
   producing a turbine blade which comprises a blade geometry that is defined in a coordinate system and at least one outwardly open cavity comprising a blade inner surface, wherein the turbine blade is cast, wherein the turbine blade is produced by:
      forming the turbine blade comprising the at least one outwardly open cavity by means of at least one casting core which comprises a casting core outer surface that forms the blade inner surface and which is removed from the at least one outwardly open cavity after a casting process,
      wherein the casting core outer surface comprises at least one planar reference surface comprising a defined setpoint position and/or a defined setpoint orientation in relation to the coordinate system in which the blade geometry is defined, and
      arranging the at least one planar reference surface in the casting core outer surface such that it forms, in the blade inner surface, at least one planar scanning surface that is accessible for a measuring head of a coordinate measuring device,
   removing the at least one casting core from the turbine blade, and
   determining a position and/or an orientation the at least one casting core previously disposed in the turbine blade by:
      scanning the at least one planar scanning surface in the blade inner surface of the turbine blade with the measuring head of the coordinate measuring device to determine a position and/or an orientation of the at least one planar scanning surface in relation to the blade geometry, and
      using the determined position and/or the determined orientation of the at least one planar scanning surface to determine the position and/or the orientation the at least one casting core previously occupied.

2. The method as claimed in claim 1,
   wherein the at least one outwardly open cavity comprises at least one opening in an outer surface of the turbine blade, the at least one casting core comprises a casting core section that forms the at least one opening, and the at least one planar reference surface is formed in the casting core section forming the at least one opening such that the at least one planar scanning surface, formed in the blade inner surface by the at least one planar reference surface, is accessible, from outside the turbine blade, for the measuring head of the coordinate measuring device.

3. The method as claimed in claim 2, wherein a planar reference surface of the at least one planar reference surface is formed in at least one casting core section forming the at least one opening such that there is formed, as the at least one planar scanning surface, a shoulder which surrounds the corresponding opening in the outer surface of the turbine blade and is recessed with respect to the outer surface of the turbine blade.

4. The method as claimed in claim 1, wherein
the at least one casting core comprises a planar reference surface of the at least one planar reference surface comprising a surface normal running in a radial direction of the turbine blade that is to be produced or counter to the radial direction of the turbine blade that is to be produced, and/or
the at least one casting core comprises a planar reference surface of the at least one planar reference surface comprising a surface normal running in an axial direction of the turbine blade that is to be produced or counter to the axial direction of the turbine blade that is to be produced, and/or
the at least one casting core comprises a planar reference surface of the at least one planar reference surface comprising a surface normal running in a circumferential direction of the turbine blade that is to be produced or counter to the circumferential direction of the turbine blade that is to be produced.

5. The method as claimed in claim 4, wherein the at least one casting core serves for forming a cavity of the at least one outwardly open cavity that is open counter to the radial direction of the turbine blade that is to be produced, and the at least one casting core comprises the planar reference surface of the at least one planar reference surface comprising the surface normal running in the radial direction of the turbine blade that is to be produced.

6. The method as claimed in claim 4, wherein the at least one casting core serves for forming a cavity of the at least one outwardly open cavity that is open in the radial direction of the turbine blade that is to be produced, and the at least one casting core comprises the planar reference surface of the at least one planar reference surface comprising the surface normal running counter to the radial direction of the turbine blade that is to be produced.

7. A method, comprising:
casting a turbine blade comprising a blade geometry;
forming an outwardly open cavity comprising a blade inner surface in the turbine blade during a casting process using a casting core comprising a casting core outer surface that forms the blade inner surface, wherein the casting core outer surface comprises a planar reference surface comprising at least one of a defined setpoint position and a defined setpoint orientation in relation to a coordinate system in which the blade geometry is defined,
forming a planar scanning surface in the blade inner surface against the planar reference surface during the casting process;
removing the casting core from the turbine blade;
scanning the planar scanning surface in the blade inner surface to determine at least one of a position and an orientation of the planar scanning surface in relation to the blade geometry;
using the at least one of a position and an orientation of the planar scanning surface to determine at least one of a position and an orientation the casting core previously disposed in the turbine blade; and
determining a wall thickness of the turbine blade using the at least one of a position and an orientation the casting core previously disposed in the turbine blade.

* * * * *